C. L. GILPATRIC.
Meat Chopper.
No. 79,465.
Patented June 30, 1868.
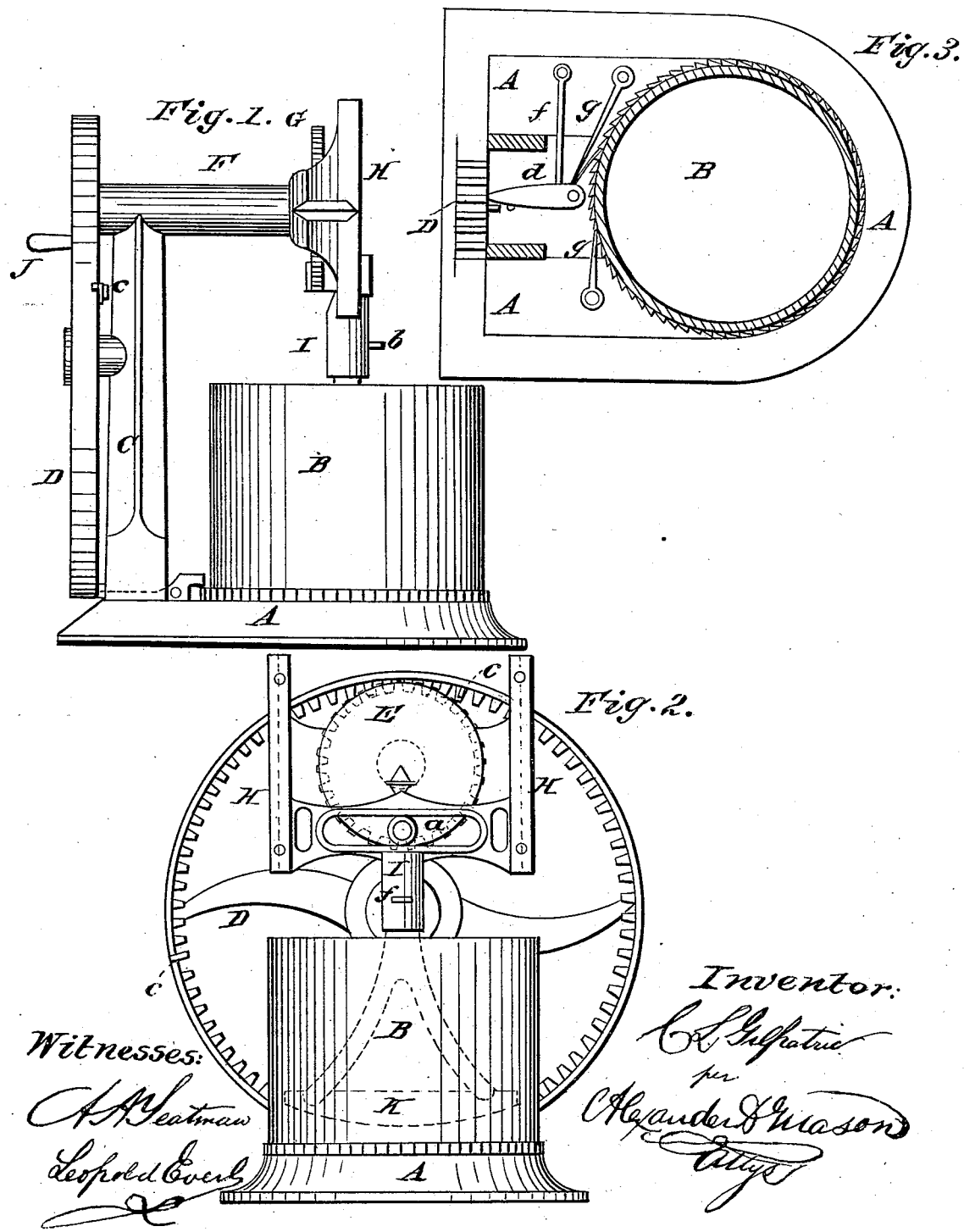

United States Patent Office.

C. L. GILPATRIC, OF BOSTON, MASSACHUSETTS.

Letters Patent No. 79,465, dated June 30, 1868.

---

IMPROVED MEAT-CHOPPER.

---

The Schedule referred to in these Letters Patent and making part of the same.

---

TO ALL WHOM IT MAY CONCERN:

Be it known that I, C. L. GILPATRIC, of Boston, in the county of Suffolk, and in the State of Massachusetts, have invented certain new and useful Improvements in Meat-Choppers; and do hereby declare that the following is a full, clear, and exact description thereof, reference being had to the accompanying drawings, and to the letters of reference marked thereon.

In the annexed drawings, forming part of this specification—

Figure 1 is a side view,

Figure 2 a front view, and

Figure 3 a plan view.

The nature of my invention consists in the arrangement of the meat-chopper, and in the manner of turning the tray.

To enable others skilled in the art to make and use my invention, I will proceed to describe its construction and operation.

A represents the bottom, on which the tray B revolves. This bottom, A, has on one side a standard, C, on the side of which the wheel D revolves. This wheel is provided with a rim on its periphery, and on the inside of this rim cogs are placed, which turn a smaller wheel, E, attached to a shaft which runs in the hollow shaft F, on top of the standard C. The circumferences of the two wheels D and E bear the proportion to each other as three to one.

The hollow shaft F, attached to the top of the standard C, extends to above the centre of the tray B, and is provided with two arms, H, which are so formed as to have grooves on their inside, perpendicularly in which the chopping-knife slides up and down.

The shaft attached to wheel E, and running through the hollow shaft F, has attached to it at its other end another wheel, G, which is provided with a revolving nut or lug, $a$, on its side, near its periphery, which nut is inserted in a slot on the frame I, for the cutting-knife K, in such a manner that when the wheel is turned, and the nut $a$ raises the frame I, this frame will slide up in the grooves on arms H H, and as the wheel is turned further, it presses the knife down.

The knife K is attached to the frame I by a screw, $b$. On the side of the rim, to the wheel D, are three lugs, $c$, placed at equal distance from each other, which lugs, as the wheel is turned by the crank, J, strike a small lever, $d$, pivoted on the bottom, A. This lever $d$ has a spring, $e$, attached, which operates on notches on the bottom of the tray B, so that when the lever $d$ is turned out of its position, the spring $e$ slides along the notches, and as soon as the lug $c$ lets the lever $d$ spring back, the spring $e$ falls in one of the notches on the bottom of the tray B, and turns it. The spiral or rubber spring $f$, fastened to the lever $d$, brings it back as soon as the lug lets it go.

The pawls $g$ $g$ serve to hold the lever and tray in proper position, so as not to allow the tray to be turned too much at one time.

The tray may also be turned by means of a wheel and shaft on the lower end of the standard, and worked, same as wheel E, by wheel D. This shaft would then run to the tray B, which would have a ratchet at the bottom. A pawl or crank-pin would then turn the tray. Or a lever on the standard C could be worked by three projections on the hub of wheel D. This lever would be connected with another lever on the bottom, A, and turn the tray.

Having thus fully described my invention, what I claim as new, and desire to secure by Letters Patent, is—

The arrangement of the cutting or chopping-knife K in the frame I, and working in the arms H H, by means of wheels, G, E, and D, and a shaft through a hollow shaft, F, substantially as and for the purposes herein set forth.

In testimony that I claim the foregoing, I have hereunto set my hand, this 28th day of April, 1868.

C. L. GILPATRIC.

Witnesses:
CHARLES W. TURNER,
JOHN F. KILTON.